United States Patent Office 3,183,146
Patented May 11, 196[5]

3,183,146
METHOD OF PROTECTING PLANTS AGAINST ARACHNIDS WITH XANTHATES
Bernardus Gerhardus van Den Bos and Jacques Meltzer, Van Houtenlaan, Weesp, Netherlands, assignors to North American Philips Company, Inc., New York, N.Y., a corporation of Delaware
No Drawing. Filed Feb. 5, 1963, Ser. No. 256,262
Claims priority, application Netherlands, Feb. 7, 1962, 274,513
5 Claims. (Cl. 167—30)

The invention relates to compositions for combating arthropoda, and in particular insects and spiders and more in particular mites, characterized by a content of a compound of the formula $$R.O.CS.S.CH_2.C_6H_5$$

in which formula R is an alkyl group having 1 to 12 and preferably 2 to 6 carbon atoms or an alkoxyalkylene group having 1 to 12 and preferably 3 to 6 carbon atoms, as an active ingredient.

Applicants have found that compositions according to the invention are also active against red spider which are resistant against known combating agents, for example, O,O-diethyl-O-4-nitrophenyl-thionophosphate. This unexpected property of the compositions may be of great importance because the phenomenon of resistance of insects and of mites, and, for example, of red spider, occurs more and more.

To the most active compositions according to the invention belong those which contain as an active ingredient the benzyl ester of ethyl-, butyl-, n-hexy- or methoxyethylene xanthogenic acid and in particular those comprising O-n-butyl-S-benzyl xanthate or O-n-hexyl-S-benzyl xanthate as an active ingredient. Other examples of active ingredients are: O-isobutyl-S-benzyl xanthate, O-isoamyl-S-benzyl xanthate, O-methylisobutyl-S-benzyl xanthate, O-2-ethylhexyl-S-benzyl xanthate and O-n-dodecyl-S-benzyl xanthate. The compositions are in particular active against eggs of the red spider. This has appeared in particular in experiments on eggs of the type *Tetranychus urticae* Koch.

The preparation of a composition according to the invention may be carried out according to a manner known for such an agent or manners analogous thereto.

A dust may be prepared, for example, by grinding 2 parts by weight of the active ingredient, 12 parts by weight of chalk and 80 parts by weight of dolomite until an average particle size of approximately 10 microns is obtained.

A wettable powder may be prepared, for example, by mixing 20 parts by weight of the active ingredient, 75 parts by weight of attapulgite, 2 parts by weight of oleylamidomethyltaurate and 3 parts by weight of sodium lignine sulphonate, and grinding until an average particle size of approximately 10 microns is obtained.

A miscible oil may be prepared, for example, by mixing 10 parts by weight of the active ingredient, 50 parts by weight of acetone, 15 parts by weight of methylethylketone, 20 parts by weight of xylene and 5 parts by weight of polyoxyethylene sorbitan fatty acid ester. An emulsion is obtained by mixing a miscible oil with water.

For the preparation of said powders, also other inert carrier substances may be used, for example, dolomite, kaolin or pipeclay; for the preparation of miscible oils, other inert diluents may be used, for example, benzene, toluene or cyclohexanone. Surface-active substances other than those mentioned may also be used.

The activity of compositions according to the invention was determined i.e. in house flies (*Musca domestic*), black flies (*Aphis fabae* Scop.) and red spider (*Tetranychus urticae* Koch). To plants which were infected with red spider and eggs thereof a dust consisting of 2 parts by weight of O-isobutyl-S-benzylxanthate and 98 parts by weight of pulverized chalk was applied. Already with very low dose, 100% killing was reached.

A similar experiment was carried out on plants which were infected with the black fly.

The activity on fruit red spider on apple was determined in experiments in which a composition according to the invention in the form of a dispersion—obtained by dispersing 5 g. of a wettable powder, consisting of 50% by weight of O-n-hexyl-S-benzyl-xanthate, 45% by weight of kaolin, 2% by weight of oxylamido-methyltanrate and 3% by weight of sodium lignin sulfonate, in 101 c water—was sprayed on apple trees infected with fruit red spider. With a very low dose, complete killing of the red spider was reached.

What we claim is:
1. A method of protecting living plants against arachnids comprising treating said plants with a benzyl xanthate of the formula:

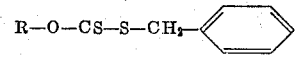

wherein R is a member selected from the group consisting of alkyl of 1–12 carbon atoms and alkoxylalkylen of 1 to 12 carbon atoms.

2. A method of protecting living plants against arachnids comprising treating said plants with a benzyl xanthate of the formula:

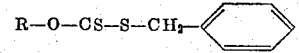

wherein R is alkyl of 2–6 carbon atoms.

3. A method of protecting living plants against arachnids comprising treating said plants with a benzyl xanthate of the formula:

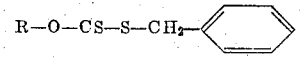

wherein R is alkoxyalkylene of 3 to 6 carbon atoms.

4. A method of protecting living plants against arachnids comprising treating said plants with O-n-butyl-S-benzyl xanthate.

5. A method of protecting living plants against arachnids comprising treating said plants with O-n-hexyl-S-benzyl xanthate.

References Cited by the Examiner
UNITED STATES PATENTS 2,839,561 6/58 Schrader _____ 167—3
2,861,913 11/58 Wegler et al. _____ 167—3

OTHER REFERENCES
Chem. Abst., vol. 55; 1961, p. 27179.

JULIAN S. LEVITT, *Primary Examiner.*
FRANK CACCIAPAGLIA, JR., *Examiner.*